A. N. DIEHL & W. AHLEN.
EXPLOSIVE GAS DETERMINATOR.
APPLICATION FILED OCT. 1, 1909.
1,150,505.
Patented Aug. 17, 1915.
5 SHEETS—SHEET 4.
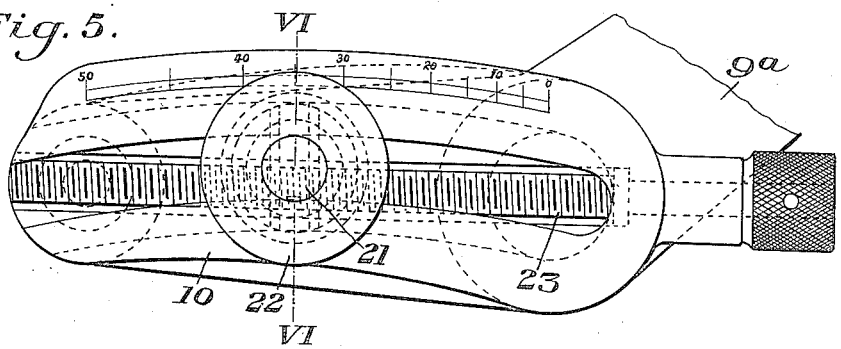
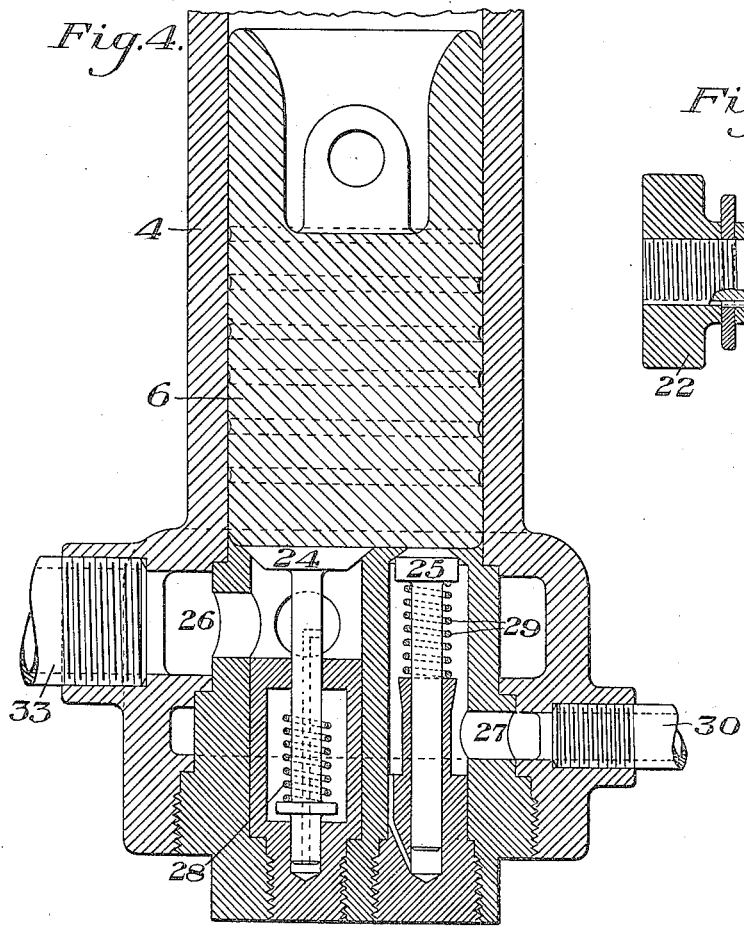
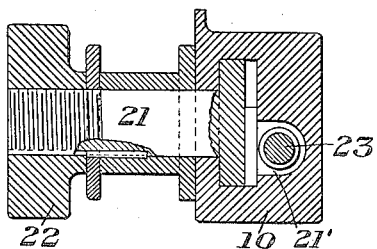
WITNESSES
R. A. Balderson
Walter Tamariss
INVENTORS
A. N. Diehl
Wm Ahlen.
by Bakewell, Byrnes & Parmelee
their Attys

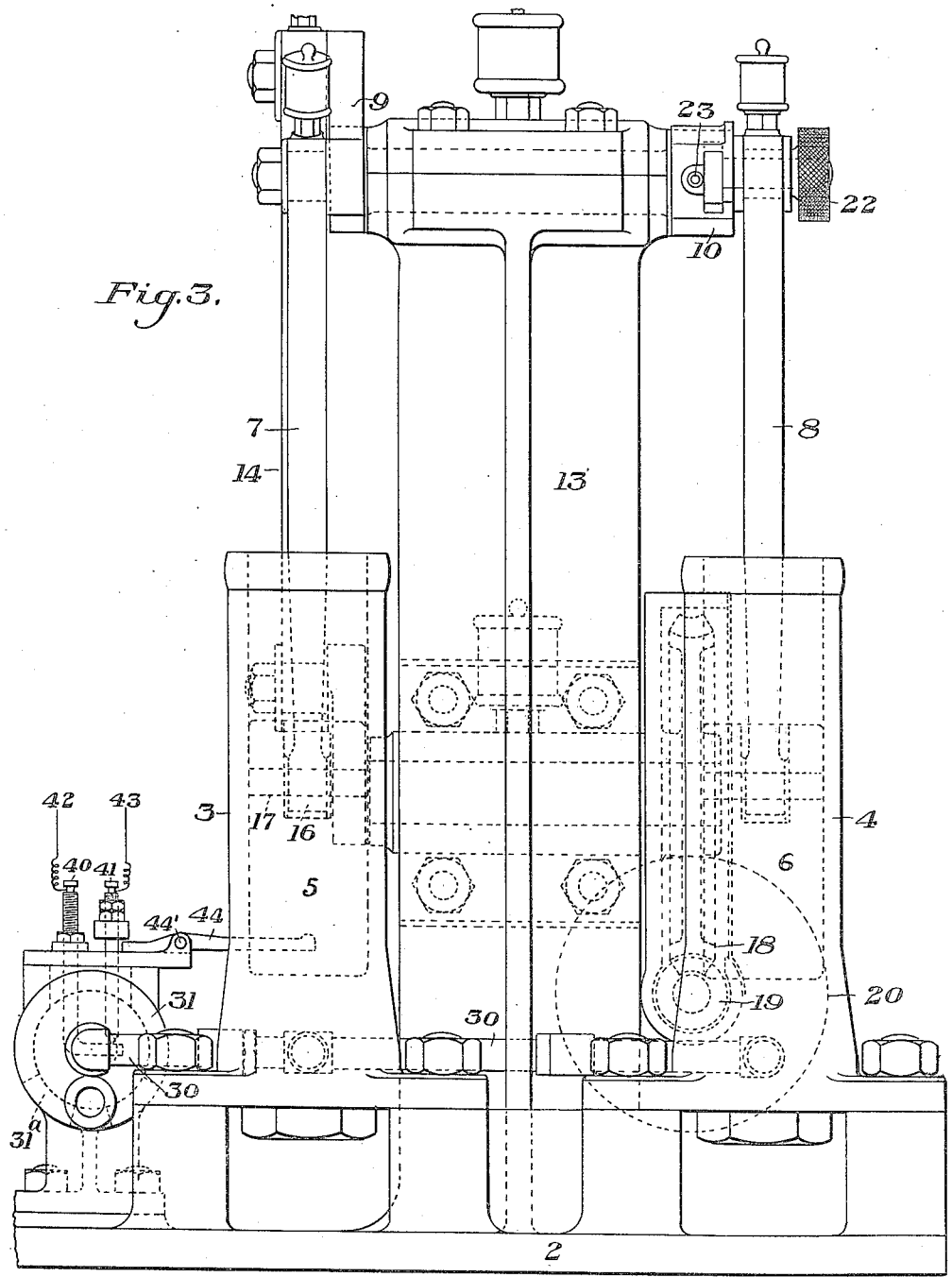

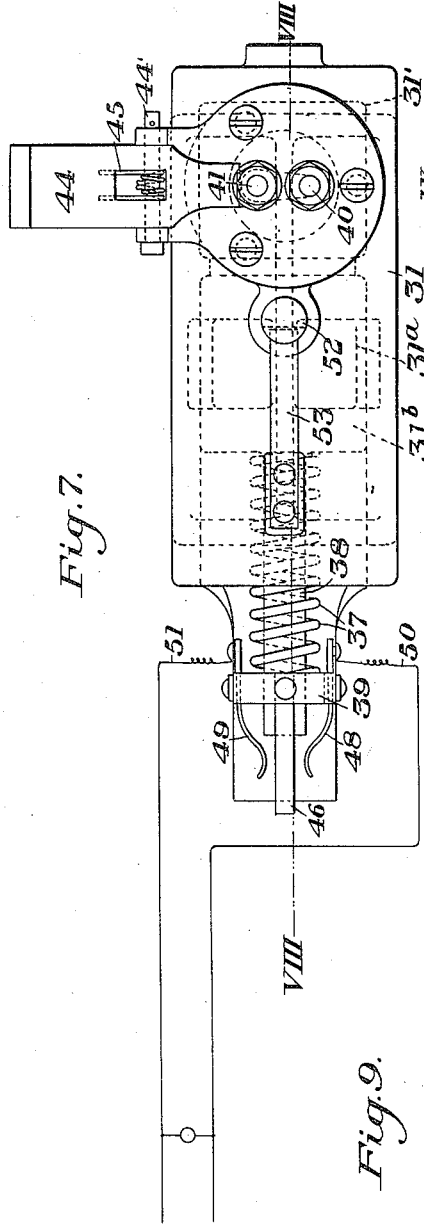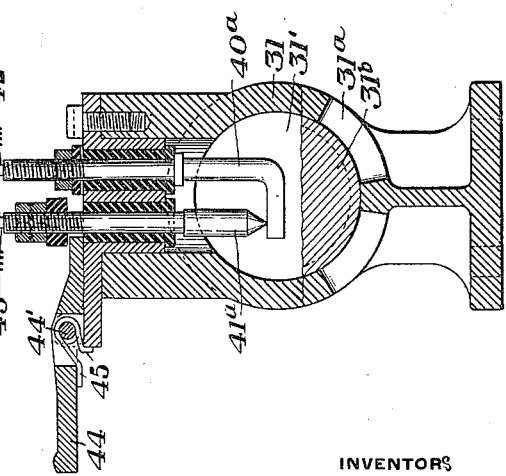

UNITED STATES PATENT OFFICE.

AMBROSE N. DIEHL AND WILLIAM AHLEN, OF DUQUESNE, PENNSYLVANIA.

EXPLOSIVE-GAS DETERMINATOR.

1,150,505.　　　　　Specification of Letters Patent.　　Patented Aug. 17, 1915.

Application filed October 1, 1909. Serial No. 520,488.

*To all whom it may concern:*

Be it known that we, AMBROSE N. DIEHL and WILLIAM AHLEN, both of Duquesne, in the county of Allegheny and State of Pennsylvania, have invented a new and useful Explosive-Gas Determinator, of which the following is a full, clear, and exact description, reference being had to the accompanying drawings, forming part of this specification, in which—

Figure 1:
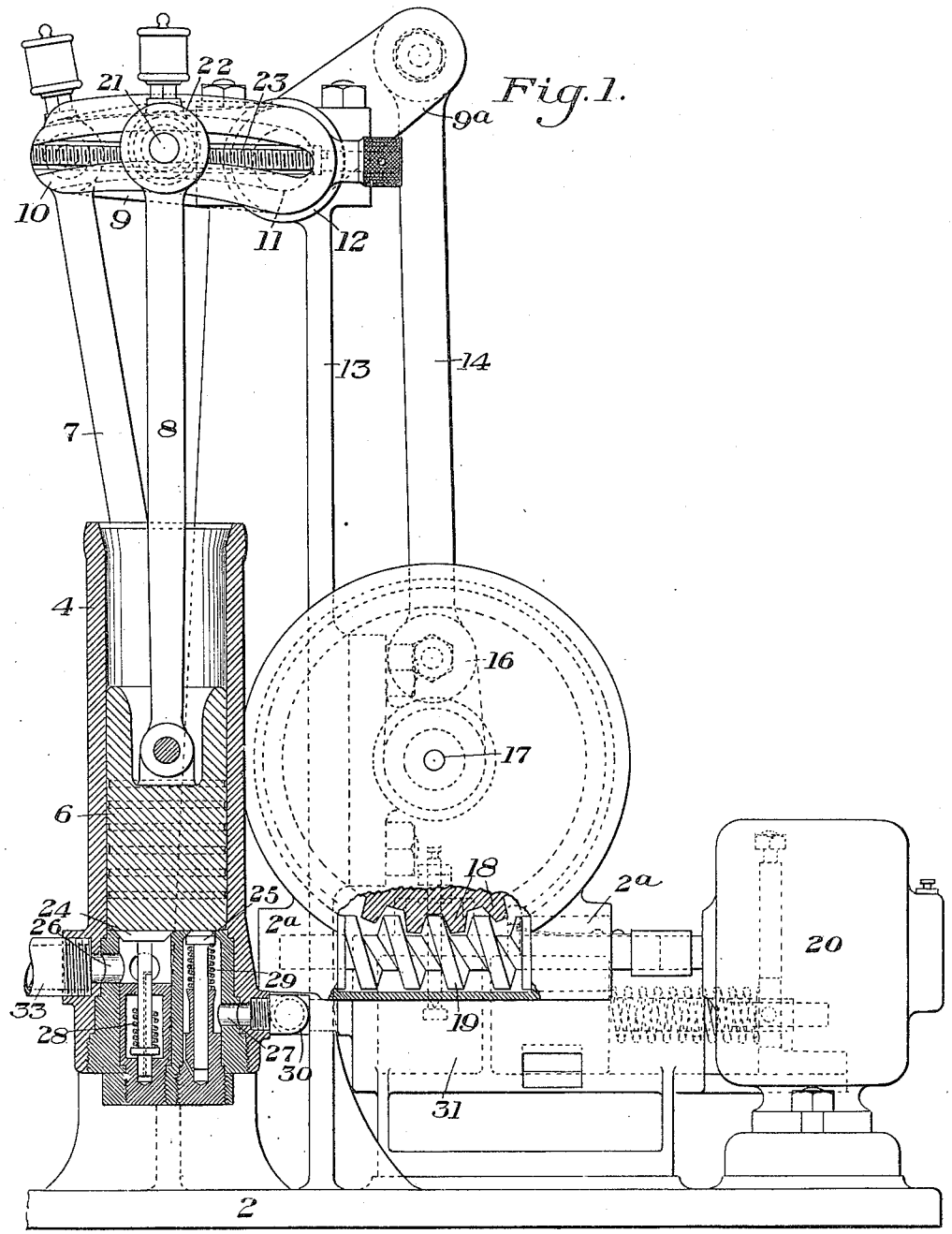
Figure 2:
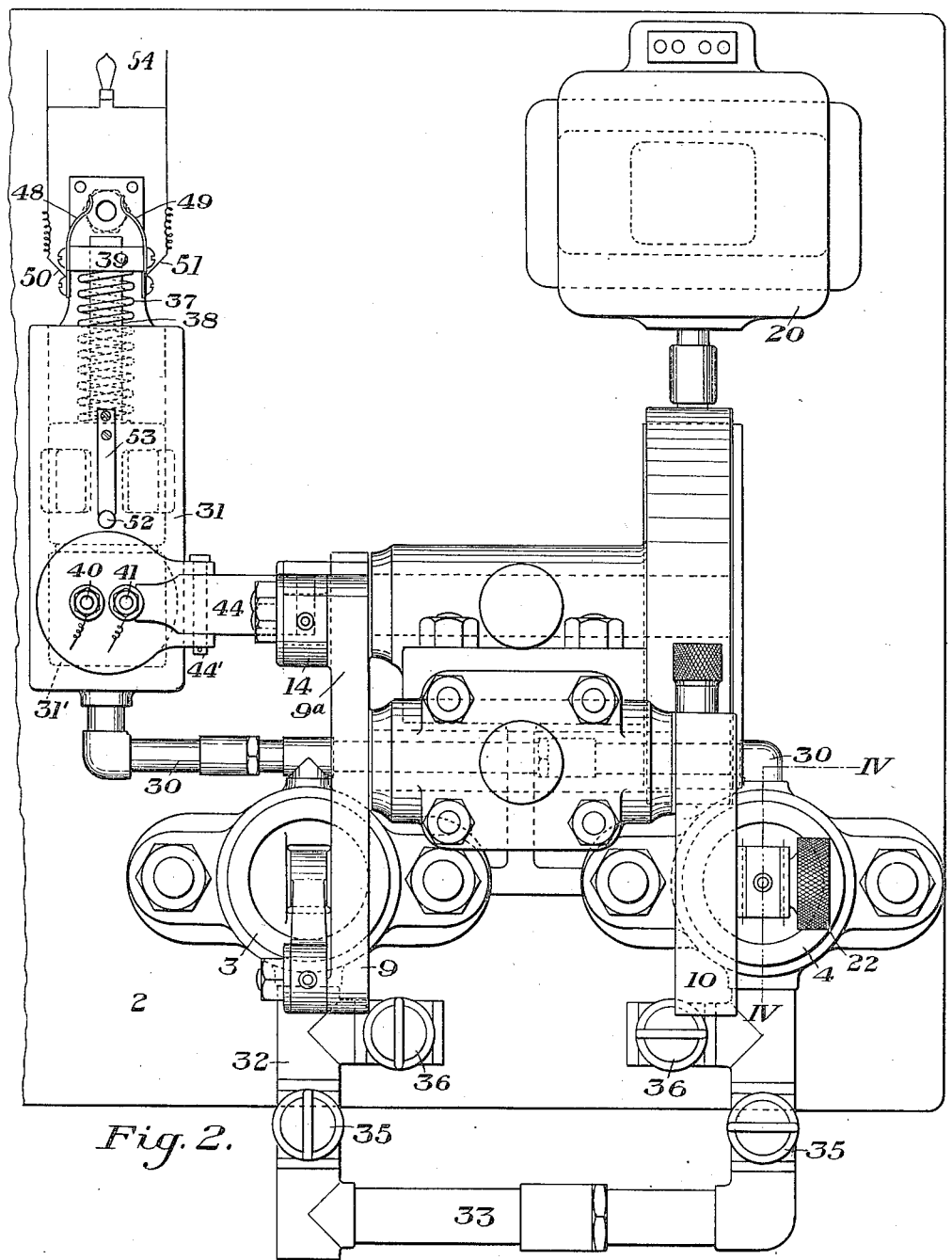

Figure 1 is a side elevation, partly in section, showing apparatus constructed and arranged in accordance with our invention; Fig. 2 is a top plan view of the same; Fig. 3 is an end elevation of the apparatus shown in Figs. 1 and 2, showing the pumping cylinders and the explosion cylinder of the determinator; Fig. 4 is a detail sectional elevation on the line IV—IV of Fig. 2 of one of the pumping cylinders, showing the arrangement of the inlet and outlet valves to the cylinder; Fig. 5 is a detail side elevation showing the adjustable link mechanism by which the stroke of the piston in one of the pumping cylinders is adjusted to vary the volume of the cylinder; Fig. 6 is a transverse section on the line VI—VI of Fig. 5 showing the means for locking the end of the piston rod in its adjusted position on the rocking link; Fig. 7 is a top plan view of the explosion cylinder into which the gaseous pressure is delivered by the pumping cylinders, Fig. 8 is a longitudinal sectional side elevation of the same taken on the line VIII—VIII of Fig. 7; Fig. 9 is a transverse section of the cylinder shown in Figs. 7 and 8, taken on the irregular line IX—IX of Fig. 8 showing the igniter by which explosive mixtures are caused to explode.

Our invention relates to mechanism employed for determining the quantity or percentage of gas and air contained in fuel gas-mains and to give warning when the proportions approach the point when the mixture becomes explosive and in this way preventing serious explosions in the fuel gas mains, damage to surrounding property and possible loss of life.

The gases generated in gas producers and the modern blast furnace plant, which is a gas producer on an extremely large scale, carry a large amount of finely divided solid materials in suspension therein which become deposited in the gas mains, in which the gases are conducted to the place of use. The gas mains must be cleaned at intervals, in order to remove the deposited solid materials. In cleaning the gas mains, should the cleaning doors be left open too long or should they be closed improperly, the leakage of air into the gas mains may be sufficient to form an explosive mixture of gas and air. With such an occurrence, there is great danger of an explosion when the gases are ignited at the gas burners of the hot blast stoves or boilers or at the gas engines or other place of use. An explosion is also possible in cases where a "slip" in a blast furnace which is a frequent occurrence, disarranges the furnace bell and hopper or the explosion doors and permits the entrance of large quantities of air into the gas mains or by leakage of air into the mains when such blast furnaces are temporarily closed down or are banked for an indefinite time.

The object of our invention is to provide mechanism for determining the proportions of gas and air contained in the gas mains and indicating when such mixture is or approaches one which is explosive, and in this way prevent the occurrence of possible serious explosions.

Another object of the invention is to provide apparatus having means for sounding an alarm and for showing a visible signal when the amount of air in the gases of the gas mains reaches a predetermined ratio or percentage.

In the drawings 2 represents the base plate of the apparatus having pumping cylinders 3 and 4 mounted thereon. The trunk pistons 5 and 6 in the cylinders are connected by piston rods 7 and 8 to one end of the lever arms 9 and 10 which are mounted on the rocking shaft 11. The shaft 11 is secured in the bearing 12 on its support 13 which is mounted upon the base plate 2 and a connecting rod 14 is connected by one end to one end 9ª of the lever 9. The opposite end of the rod 14 is attached to the crank 16 on one end of the worm-wheel shaft 17, and the worm wheel 18 on this shaft is rotated by the worm 19 mounted in the bearings 2ª on the base plate 2, the worm being driven by the motor 20 also mounted on the base plate.

The upper end of the piston rod 8 is adjustably secured to the slotted arm or link 10 by means of a pin 21 and nut 22 and the end of the rod 8 is held in its adjusted position by means of the adjusting screw 23 which is threaded into the extension 21' on the head of the pin 21. The outer face of the slotted link 10 is graduated so as to indicate the stroke of the piston in the several positions of the rod on the link 11.

The single acting cylinders 3 and 4 are provided on their lower ends with inlet valves 24 and outlet valves 25 which close the inlet ports 26 and outlet ports 27, being normally held seated by means of the springs 28 and 29. The outlet ports 27 on the cylinders 3 and 4 are connected by the pipe 30 to the combustion chamber 31' of the explosion cylinder 31 and the cylinder inlet ports 26 are connected by the pipes 32 and 33 with the pipe 34 which is connected to the gas main. The pipes 32 and 33 are each provided with a gas valve 35 and air valve 36 through which air or gas can be admitted to and shut off from either of the pumping cylinders 3 or 4. Also mounted on the base plate 2 of the apparatus is an explosion cylinder 31 having a reciprocating piston 31$^b$ which is yieldingly pressed forward into the cylinder 31 by the spring 37 which embraces the guide rod 38 of the piston 32 and is held in position by the guide support 39, on the cylinder 31. The cylinder 31 is provided with an exhaust port 31$^a$ through which the compressed fluids escape, the spring permitting the piston 31$^b$ to move sufficiently to uncover this port at each compression stroke of the cylinder pistons. Located in the forward or combustion chamber end of the explosion cylinder 31 is a gas igniter, which, as shown, is formed of a stationary finger 40$^a$ and a movable finger 41$^a$ the end of the finger 41$^a$ being spring pressed into engagement with the bent end of the finger 40$^a$. The upper end of each finger is provided with a terminal 40—41 connected to the conductors 42 and 43 which supply electrical current to the fingers from any suitable battery or source of electrical energy. Pivotally mounted on the cylinder 31 is a lever 44 one end of which engages with and lifts the movable finger 41$^a$.

A spring 45 is provided to normally hold the lever 44 in the position shown and return it to this position each time it is rocked on its pivot pin 44'. The outer end of the lever 44 is located in the path of the lower end of the rod 14 connected to the crank 16 so as to be contacted by and depressed at each revolution of the crank shaft 17, this operation lifting the inner end of the finger 41$^a$ and making a gap between the fingers 40$^a$ and 41$^a$, across which gap the electric current will jump and form a spark and ignite or fire an explosive mixture in the cylinder 31. The end of the guide rod 38 is arranged to contact with and strike the clapper 46 which is pivoted to the guide support 39, when impelled forwardly by an explosion in the cylinder, and cause the clapper to strike the bell or gong 47 on the guide support. The guide support 39 is also provided with contacts 48 and 49 which are contacted by the end of the guide rod 38 when the piston is moved outwardly in the cylinder 31. When such contact is effected a circuit is completed through the conductors 50 and 51 secured to the contacts 48, 49, and a lamp 54 or series of lamps. The lamps become and remain lighted so long as the end of the rod 38 is in position to complete the circuit through the contacts 48, 49. A pin 52 is arranged to move downwardly in an opening through the side wall of the cylinder 31 and hold the piston at the end of its outward stroke until released manually and the spring 53 is provided to move the pin 52 downwardly in the cylinder when its movement is permitted by the position of the piston.

In the operation of our improved apparatus, the motor 20 is started and the inlet valves are set to admit air and gas each into the desired cylinder. The stroke of the piston 5 is constant while that of the piston 6 in the cylinder 4 is adjustable, to enable varying amounts of the fluid being compressed being drawn into this cylinder. The stroke of the piston is changed by shifting the pin 21 on the link 10 so as to vary the distance between the centers of the pin 21 and rock shaft 11, in this way providing means for varying the volume of fluid compressed in this cylinder, while always moving the piston 6 forwardly so as to expel all of the compressed fluid from the cylinder, no matter what be the length of stroke of the piston. The face of the link 10 is graduated so as to indicate the length of the stroke of the piston 6, with different positions of the pin 21 on the link 10, in this way showing the varying volumes of fluid delivered from the cylinder 4. As the volume of fluid delivered by the cylinder 3 is constant, the percentage of the mixture delivered into the explosion chamber by each cylinder is easily and quickly determined. It will be noted that as shown the pistons move in the same direction simultaneously. At each stroke of the pistons a constant volume of fluid from one cylinder and a volume which can be varied from the other cylinder is delivered through the pipes 30 into the explosion cylinder. When the lower end of the connecting rod 14 has reached its lowest position it will have moved the lever 44 so as to lift the movable finger 41$^a$ of the igniter so as to produce a spark within the combustion chamber of the explosion cylinder. When the mixture in the combustion chamber is explosive, an explosion will occur, which will force the piston 32 outwardly so as to compress the spring 37, bring the end of the rod 38 into engagement with the clapper 46 and ring the bell 47 and also complete the circuit between the contacts 48 and 49, so as to cause the lamps in the circuit to burn. Where the piston has been moved past the pin 52 the spring 53 forces the pin inwardly and the end of the piston on its return movement will engage with the side of the pin, and prevent its moving backward until the pin is lifted out of engagement with the piston. The pipes 32, 33, 34 and valves 35 and 36 are arranged to supply either gas or air to either cylinder 3 or 4 as is desired in this way permitting the percentage of air in the gases in the mains to be determined from zero to 100 per cent. Should one of the cylinders be arranged to deliver a constant volume of gases from the mains and 20 per cent. of this volume of air be added in the explosion chamber by the other cylinder such mixture should explode at every discharge stroke of the pistons and would indicate a perfect gas. By then moving the pin 21—on the link 10 to shorten the stroke of the piston—a smaller amount of air will be contained in the mixture supplied to the combustion chamber and the explosions should cease. Should they however, continue, this will indicate that the gases drawn from the main contain air. By again moving the pin 21 on the link 10 to further shorten the stroke of the piston the amount of air necessary to add to that contained in the gases in the gas mains in order to form an explosive mixture will be indicated. For example, when the stroke of the adjustable piston has been set so as to add 10 per cent. of air to the gases supplied from the mains to the combustion chamber and the explosions still occur in the explosion cylinder, the 10 per cent. of air necessary to form an explosive mixture must be present in the gases drawn from the gas main. This would indicate leakage of air into the gas mains to an extent which should be prevented.

The advantages of our invention will be apparent to those skilled in the art. The apparatus is simple and is easily kept in repair.

Modifications in the construction and arrangement of the parts may be made without departing from our invention.

We claim:

1. An explosive gas determinator comprising pumping cylinders having inlet and outlet ports, pistons within the cylinders, one having a fixed and the other a variable throw, means connecting the inlet ports with a fuel gas main and one with an air supply, an explosion chamber connected with the outlet ports, an outlet port on the chamber to permit escape of gases delivered thereinto from the cylinders, means for firing explosive mixtures delivered into the explosion chamber, and mechanism for indicating the ignition of an explosive mixture in the chamber.

2. An explosive gas determinator comprising pumping cylinders having inlet and outlet ports, pistons within the cylinders, means for imparting a fixed throw to one of the pistons and a variable throw to the other one, means connecting the outlet ports, one with a fuel gas main and one with an air supply, an explosion chamber connected with the outlet ports, an outlet port on the chamber to permit escape of gases delivered thereinto from the cylinders, means for firing explosive mixtures delivered into the explosion chamber, and mechanism for indicating the ignition of an explosive mixture in the chamber, such mechanism being adapted to show the occurrence of an explosion for an indefinite time interval.

In testimony whereof, we have hereunto set our hands.

A. N. DIEHL.
WILLIAM AHLEN.

Witnesses:
Geo. T. Neff,
T. E. McDowell.